(12) United States Patent
Koike

(10) Patent No.: US 7,475,284 B2
(45) Date of Patent: Jan. 6, 2009

(54) REDUNDANCY SYSTEM HAVING SYNCHRONIZATION FUNCTION AND SYNCHRONIZATION METHOD FOR REDUNDANCY SYSTEM

(75) Inventor: Tomotake Koike, Chiba (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 474 days.

(21) Appl. No.: 11/377,187

(22) Filed: Mar. 17, 2006

(65) Prior Publication Data
US 2006/0224918 A1  Oct. 5, 2006

(30) Foreign Application Priority Data
Mar. 31, 2005  (JP) ............................. 2005-102378

(51) Int. Cl.
*G06F 11/00* (2006.01)
(52) U.S. Cl. ...................................... 714/12
(58) Field of Classification Search ................ 714/2, 714/3–13, 15, 18, 26, 37, 39
See application file for complete search history.

(56) References Cited

U.S. PATENT DOCUMENTS

| | | | | |
|---|---|---|---|---|
| 5,408,649 A | * | 4/1995 | Beshears et al. | .............. 714/10 |
| 6,910,148 B1 | * | 6/2005 | Ho et al. | ......................... 714/4 |
| 7,181,642 B1 | * | 2/2007 | Heideman et al. | .............. 714/6 |
| 7,246,255 B1 | * | 7/2007 | Heideman et al. | .............. 714/4 |
| 2003/0135642 A1 | * | 7/2003 | Benedetto et al. | ........... 709/238 |

FOREIGN PATENT DOCUMENTS

JP  2001-345850  12/2001

* cited by examiner

*Primary Examiner*—Nadeem Iqbal
(74) *Attorney, Agent, or Firm*—Venable LLP; James R. Burdett

(57) ABSTRACT

A redundancy system that can perform synchronization even if a failure occurs to an application. According to the redundancy system of the present invention, a synchronization data memory area, a management bit map table having a flag created for each segment of the synchronization data memory area, and a management memory area for storing the starting address of the segment are set in each device. In the service application process, a service is performed using one or more segments, a flag corresponding to the segment is set, and synchronization information is written to the management memory each time the segment is written or overwritten. In the read process, each flag in the management bit map table is checked, and if a flag being set exists, the synchronization data is read from the segment corresponding to the synchronization information stored in the management memory, and the flag is reset.

22 Claims, 6 Drawing Sheets

REDUNDANCY SYSTEM HAVING SYNCHRONIZATION FUNCTION AND SYNCHRONIZATION METHOD FOR REDUNDANCY SYSTEM

BACKGROUND OF THE INVENTION

1. Field of the Invention

The present invention relates to a technology for performing the synchronization of a redundancy system. The present invention can be applied to a multimedia communication server to provide integrated data and voice communication services, for example.

2. Description of Related Art

A redundancy system has two or more devices having the same functions, and uses one of these devices for services. One device in the status of processing the service is called an "active device", and the other one or more devices is/are called the "standby device(s)". When the active device fails, one of the standby devices is switched to active. The failure of the device which is no longer in active status is automatically or manually recovered. The device recovered from failure becomes standby status preparing for the case when failure occurs to an active device.

The redundancy system has an advantage in that the services interruption time, when a failure occurs to a device, is short. Also the redundancy system is expected to continue services without allowing the user to recognize the occurrence of the failure.

In order to transfer to processing from the former active device to the new active device, data stored in these devices must match. If the stored data does not match, the new active device cannot succeed the services of the former active device. The processing to match the stored data of these devices is called "synchronization". A technology to perform synchronization is disclosed in Japanese Patent Application Laid-Open No. 2001-345850. The redundancy system of this document has an information server which performs centralized management of the stored data of the CA (Call Agent), that is each device. The new active server can acquire the stored data of the former active server by reading the original data from the information server.

The redundancy system in the above document, however, cannot perform synchronization if a failure occurs to an application which provides service. Therefore if such a failure occurs, the data overwritten after the previous synchronization cannot be sent to the standby device. Because of this, the system in the above mentioned document cannot guarantee perfect synchronization.

SUMMARY OF THE INVENTION

It is an object of the present invention to provide a redundancy system which can perform synchronization even if a failure occurs to an application.

The redundancy system according to the present invention comprises: a plurality of devices of which active status and standby status can be switched; a synchronization data memory installed in each of the plurality of devices; a management bit map table having a flag created for each segment of the synchronization data memory in an active device; a management memory for storing synchronization information including a starting address of the segment; a first processor for performing service using one or a plurality of segments, and setting the flag corresponding to a segment and writing the synchronization information to the management memory each time the segment is written or overwritten; and a second processor for checking each flag in the management bit map table at a predetermined timing, and reading synchronization data from the segment corresponding to the synchronization information stored in the management memory and resetting the flag if a flag being set exists.

The synchronization method for a redundancy system according to the present invention comprises: a first step of setting a synchronization data memory area in each shared memory of a plurality of devices of which active status and standby status can be switched; a second step of setting a management bit map table having a flag created for each segment of a synchronization memory in the shared memory in an active device; a third step of setting a management memory area for storing a synchronization information including a starting address of the segment in the shared memory of the active device; a fourth step of causing a processor to execute a service application process of performing service using one or a plurality of segments, and setting a flag corresponding to a segment and writing the synchronization information to the management memory area each time the segment is written or overwritten; and a fifth step of causing the processor to execute a read process of checking each flag in the management bit map table at a predetermined timing, and reading synchronization data from the segment corresponding to the synchronization information stored in the management memory area and resetting the flag when a flag being set exists.

BRIEF DESCRIPTION OF THE DRAWINGS

Other objects and advantages of the present invention will be described with reference to the following accompanying drawings.

DESCRIPTION OF THE PREFERRED EMBODIMENTS

Figure 1:
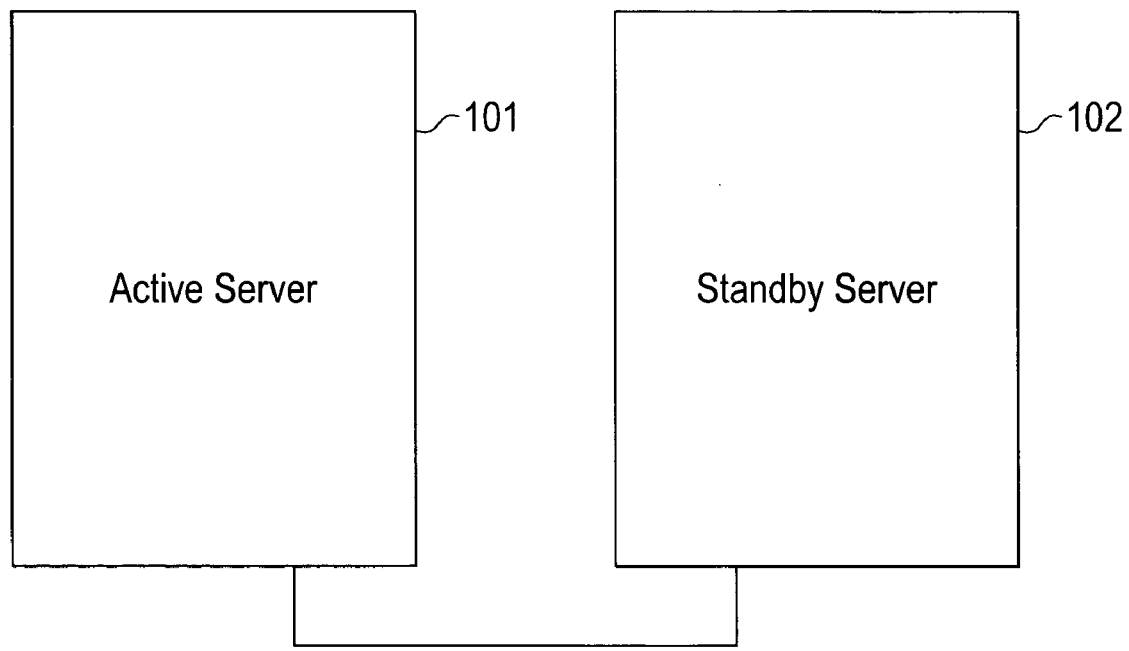
FIG. 1 is a block diagram depicting the configuration of the redundancy server system according to an embodiment of the present invention.

Embodiments of the present invention will now be described with reference to the drawings. In the drawings, the size, shape and positional relationship of each composing element are roughly shown merely to assist in understanding the present invention, and the numerical conditions to be described below are merely examples.

The present embodiments will be described using the case of creating applications to be used for service by an object oriented program as an example.

FIG. 1 is a block diagram depicting the configuration of the redundancy server system according to the present embodiment. As FIG. 1 shows, the redundancy server system 100 of the present embodiment comprises two servers 101 and 102. The servers 101 and 102 have an identical hardware configuration. In the case of the example in FIG. 1, the server 101 is in active status and the server 102 is in standby status. Just like a conventional redundancy system, the active server 101 performs services for the user. If a failure occurs to the server 101, the status of the server 102 is switched from standby to active. The new active server 102 takes over the data from the server 101. The server 101 enters standby status after the failure is recovered.

The present embodiment can also be applied to a system comprising three or more servers.

Figure 2:
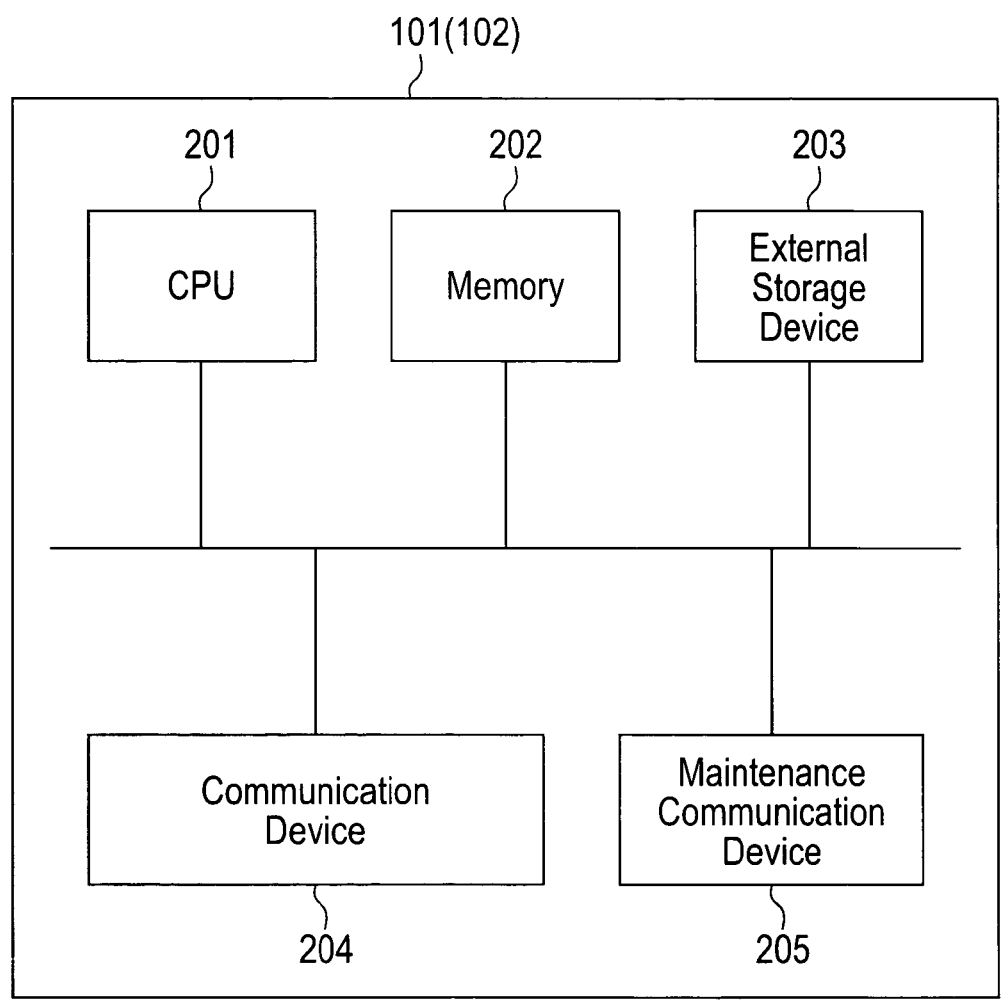
FIG. 2 is a block diagram depicting the hardware configuration of the server according to an embodiment of the present invention.

FIG. 2 is a block diagram depicting the hardware configuration of the server 101 or 102. As described above, the hardware configuration of the servers 101 and 102 is identical. As FIG. 2 shows, each of the servers comprises a CPU (Central Processing Unit) 201, memory 202, external storage device 203, communication device 204 and maintenance communication device 205.

The CPU 201 executes the later mentioned software (see FIG. 3), and controls the entire server. Also the CPU 201 checks for the occurrence of a failure.

The memory 202 can be structured by a semiconductor memory device, such as RAM (Random Access Memory). In the memory 202, the later mentioned shared memory area (see FIG. 3) is set.

The external storage device 203 is a hard disk, for example. The external storage device 203 stores the operating system, object oriented programs, and software to implement the later mentioned functions (see FIG. 3).

The communication device 204 performs communication with an IP telephone accommodated in VoIP-PBX, that is the redundancy system 100, controls communication to establish a call connection, and performs voice communication with another VoIP-PBX.

Figure 3:
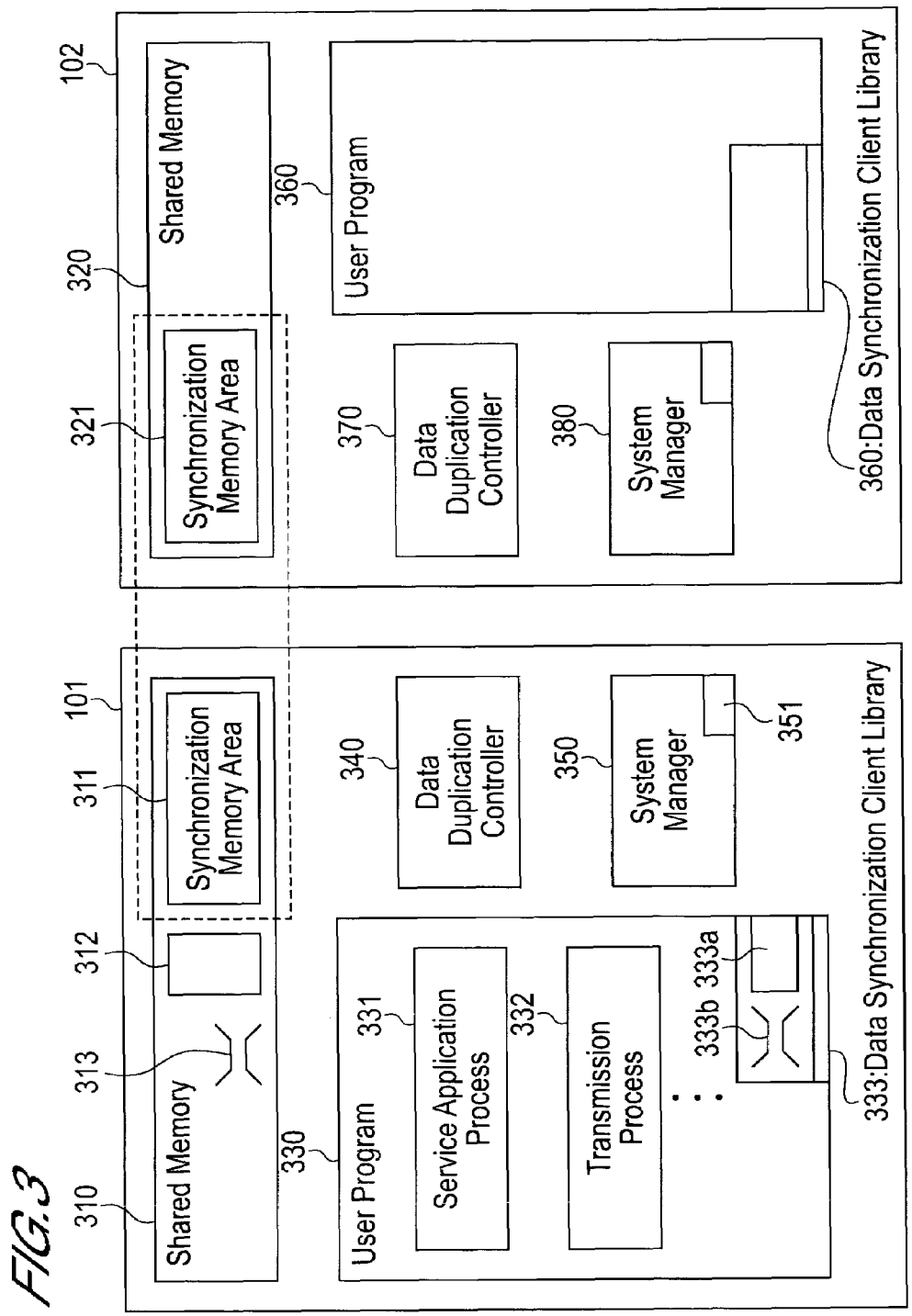
FIG. 3 is a block diagram depicting the functional configuration of the server according to an embodiment of the present invention.

FIG. 3 is a conceptual diagram depicting the functions of the servers 101 and 102. In the case of the example in FIG. 3, the server 101 is in active status and the server 102 is in standby status.

In the memory 202 in the servers 101 and 102 (see FIG. 2), the shared memory area 310 and 320 is set, and in the shared memory area 310 and 320, the synchronization memory area 311 and 321 is set.

In the synchronization memory area 311 and 321, data and instances to be synchronized between the servers 101 and 102 are stored. An instance is an object constructed in memory. By synchronization, data stored in the synchronization memory areas 311 and 321 become identical. The synchronization memory area 311 and 321 is divided into one or more virtual segments. The lengths of segments are properly set according to the length of data to be stored.

Also in the shared memory area 310 in the active server 101, the management bit map table 312 and synchronization request queue 313 are created. When the server is in standby status, the management bit map table and synchronization request queue are not created in the shared memory area.

The management bit map table 312 is a table for managing the presence of a synchronization request from each segment being set in the synchronization memory area 311. The synchronization request is managed using the flag of the management bit map table 312. When synchronization of segments is requested, the corresponding flag is set by the later mentioned service application process 331. When synchronization of segments ends, on the other hand, the corresponding flag is reset by the later mentioned transmission process 332.

The synchronization request queue 313 queues the starting address and size of the segment in which data is rewritten. The synchronization request queue 313 is an FIFO (First In First Out) memory. The queued segment information, that is the starting address and size, is written by the later mentioned service application process 331, and is read by the later mentioned transmission process 332.

The CPU 201 of the active server 101 constructs the user program 330, data duplication controller 340 and system manager 350 as software.

The user program 330 of the present embodiment is an object oriented program. The user program 330 includes a service application process 331, transmission process 332 and data synchronization client library 333.

The service application process 331 is an application to perform services for the user. When the active server 101 is performing a plurality of types of services, the CPU 201 executes a plurality of types of service application processes 331. The service application process 331 uses the synchronization memory area 311 of the shared memory area 310 as the memory area to perform the temporary storage of data and construction of instances.

The transmission process 332 reads information from the synchronization request queue 313, and reads the data corresponding to this information from the synchronization memory area 311. The transmission process 332 sends the information read from the synchronization request queue 313 and the synchronization memory area 311 to the data duplication client library 333.

The data duplication client library 333 receives information from the transmission process 332, and creates a synchronization data management table (not illustrated) using this information. For this, the data duplication client library 333 has an API (Application Program Interface) function to communicate with the user program 330. The synchronization data management table includes synchronization data, synchronization ID, starting address of synchronization data, size of synchronization data, user receive function and data and size of the unit. The synchronization data is data and instances to be synchronized. The synchronization ID is an ID assigned to the segment of the synchronization memory area 311, and is used to identify the synchronization data. The user receive function is a function in the user program 360 which is called when the data duplication client library 361 (described later) transfers data to the user program 360. The data and size of the unit is the data and size of the corresponding segment. The data duplication client library 333 receives transmission control information and transmission instructions from the data duplication controller, and sends the information stored in the synchronization data management table to the data duplication client library 361 (described later) of the standby server 102. This information is sent by the transmission thread 333a of the data duplication client library 333. This information is stored in the TCP (Transmission Control Protocol) queue 333b, and then sent from the TCP queue 333b in the stored sequence. As mentioned later, the creation and transmission of a table are executed asynchronously.

The data duplication controller 340 stores information necessary for control communication for synchronization, such as the port numbers of the data duplication client libraries 331 and 341. The data duplication controller 340 receives the synchronization start instruction or interruption instruction from the system manager 350, and sends this instruction and managed information to the data duplication client library 333.

The system manager 350 controls the start, interruption and stop of synchronization. The start timing of synchronization can be decided by the system manager 350 monitoring the status of the service application process 331, for example. The synchronization is interrupted when the active/standby of the servers 101 and 102 are switched by a failure occurrence or for other reasons of the service application process 331, for example. Also when the server 101 cannot be recovered from a failure for a long period of time, or when the server 101 is in a maintenance process, synchronization is stopped.

The CPU 201 of the standby server 102 constructs the user program 360, data duplication controller 370 and system manager 380 as software.

The user program 340 of the present embodiment is constituted by an object oriented program. The user program 340 includes the data duplication client library 341. The data duplication client library 341 creates the synchronization data management table using the information received from the data duplication client library 333. The data duplication client library 341 synchronizes the data stored in the synchronization memory area 321 with the data stored in the synchronization memory area 311 using the synchronization data management table.

The data duplication controller 370 and system manager 380 have the same configuration as the above mentioned data duplication controller 340 and system manager 350, but are not used when the server 102 is in standby status.

Now the operation of the redundancy server system 100 according to the present embodiment will be described.

First the operation of the server system 100 when the service application process 331 is normal will be described with reference to FIG. 4 and FIG. 5.

When the system is started, the user programs 330, 360 and other software start operation. As mentioned above, the user program 330 can operate a plurality of types of service application processes 331 in parallel.

Figure 4:
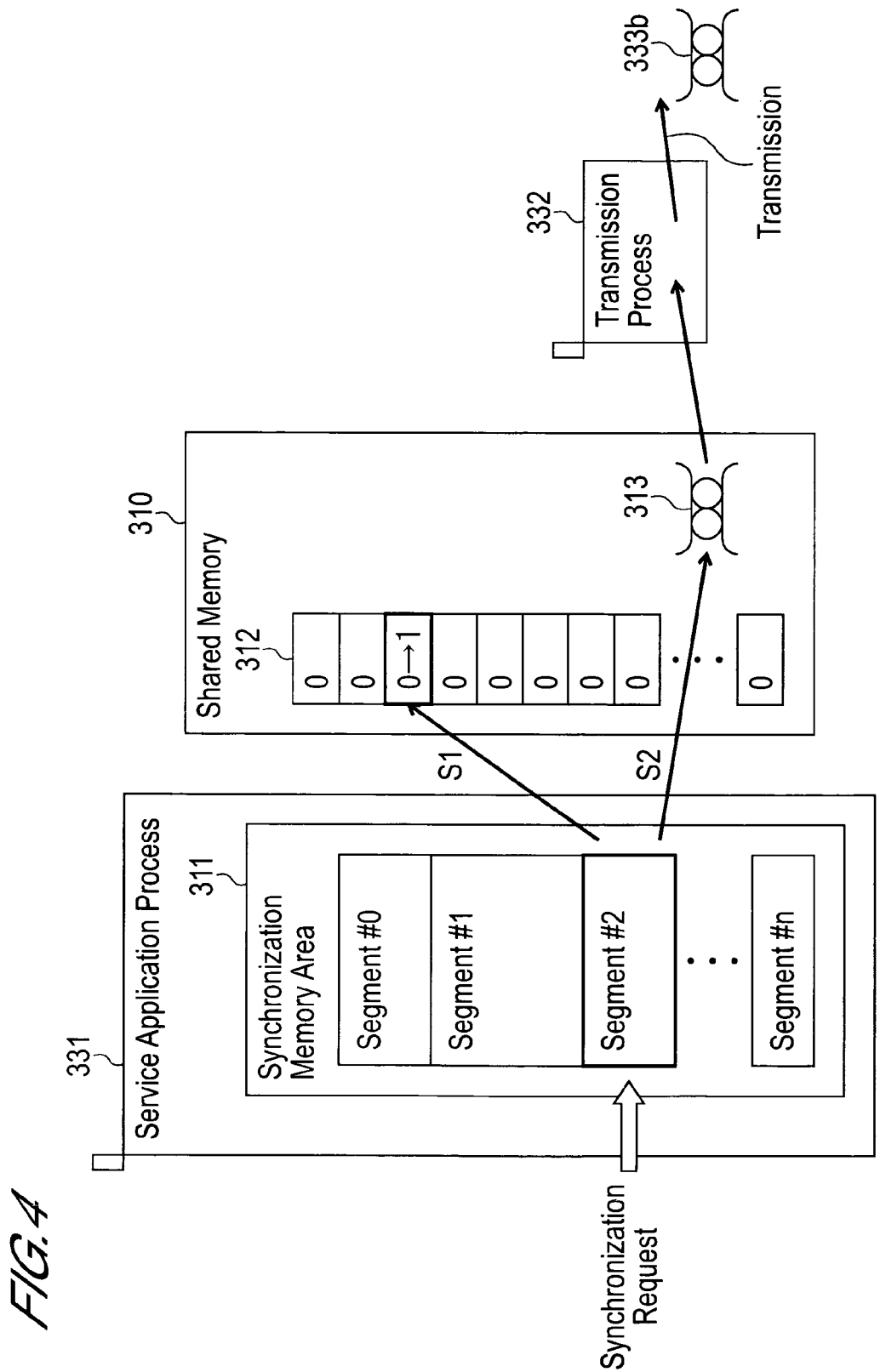
FIG. 4 to FIG. 6 are conceptual diagrams depicting the operation of the redundancy server system according to an embodiment of the present invention.

Then the synchronization memory area 311, management bit map table 312 and synchronization request queue 313 are set in the shared memory area 310 of the active server 101 (see FIG. 4). The synchronization memory area 311 and management bit map table 312 are created for each service application process 331. In the shared memory area 320 of the standby server 102, the synchronization memory area 321 is set.

The user program 330 executes the service application process 331. When the service application process 331 starts up, one or more segments (segment #0 to #n in the example in FIG. 4) in the synchronization memory area 311 are allocated to this process 331. The service application process 331 performs the construction of instances and temporary storage of the data using these segments. Also the service application process 331 overwrites the data and instances in the synchronization memory area 311 if necessary. When a segment is written or overwritten, the service application process 331 sets a flag corresponding to this segment in the management bit map area 312 (see step S1 in FIG. 4). At the same time, the service application process 331 stores the information including the starting address and size of the segment to the synchronization request queue 313 (see step S2 in FIG. 4).

Figure 5:
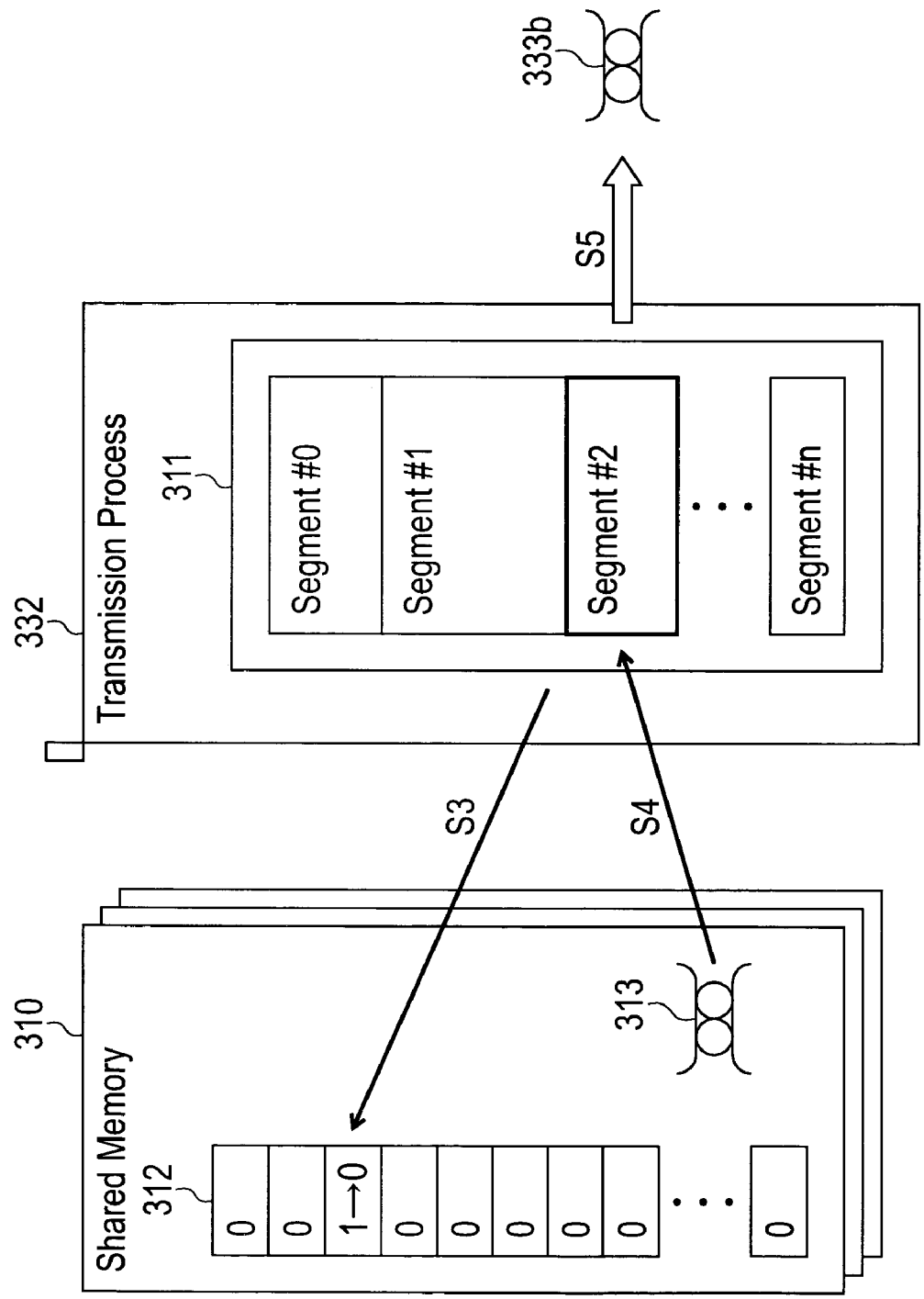

The transmission process 332 checks each flag of the management bit map area 312 (see step S3 in FIG. 5). The check timing is arbitrary. For example, the flag can be checked at each predetermined time. The flag may be checked when the total of sizes of the segments which require synchronization exceeded a predetermined value. In the case of checking at each predetermined time, check timing can be decided by the transmission process 332, for example. The total of the size of the segments which require synchronization can be computed by the service application process 331, for example. In this case, when the computation result exceeds the predetermined value, the service application process 331 instructs the transmission process 332 to check the flag.

If a flag being set exists, the transmission process 332 reads the queued information, that is the starting address and size of the segment, from the synchronization request queue 313 (see step S4 in FIG. 5). Then the transmission process 332 reads the stored information, that is synchronization data, from the segment corresponding to the information. The transmission process 332 also sends the information read from the segment and synchronization request queue 313 to the data duplication client library 333. The transmission process 332 then resets the flag corresponding to the synchronization data which was read. This series of processing is repeated until the flag being set no longer exists.

The data duplication client library 333 creates the synchronization data management table using information received from the transmission process 332. As mentioned above, the synchronization data management table includes the synchronization data, synchronization ID, starting address of the synchronization data, size of the synchronization data, user receive function and data and size of the unit.

The system manager 350 instructs the data duplication controller 340 to start synchronization at a predetermined timing. As mentioned above, the timing to start synchronization is decided by the system manager 350 according to the status of the service application process 331.

When the start instruction is received, the data duplication controller 340 sends this instruction and the above mentioned communication information to the data duplication client library 333.

When the instruction and information are received from the data duplication controller 340, the data duplication client library 333 generates packets which includes the information stored in the synchronization data management table, and queues the packets in the TCP queue 333*b* (see step S5 in FIG. 5). Then the transmission thread 333*a* sequentially reads the packets from the TCP queue 333*b* and sends the packets to the data duplication client library 361 of the standby server 102.

The data duplication client library 361 receives information corresponding to the synchronization data management table. Based on the received information, the data duplication client library 361 creates the synchronization data management table in the library 361.

Then the data duplication client library 361 sends the user receive function included in the synchronization data management table to the user program 360. Using this function, the user program 360 executes the process for storing the synchronization data to the synchronization memory area 321. In this write process, the synchronization data is written to the synchronization memory area 321 based on such information as the synchronization ID, starting address of the synchronization data, size of the synchronization data and data and size of the unit. By this, the same synchronization data is stored in the same address of the synchronization memory areas 311 and 321. The synchronization data may be directly written by the data duplication client library 361. In this case, the user receive function is not used.

Figure 6:
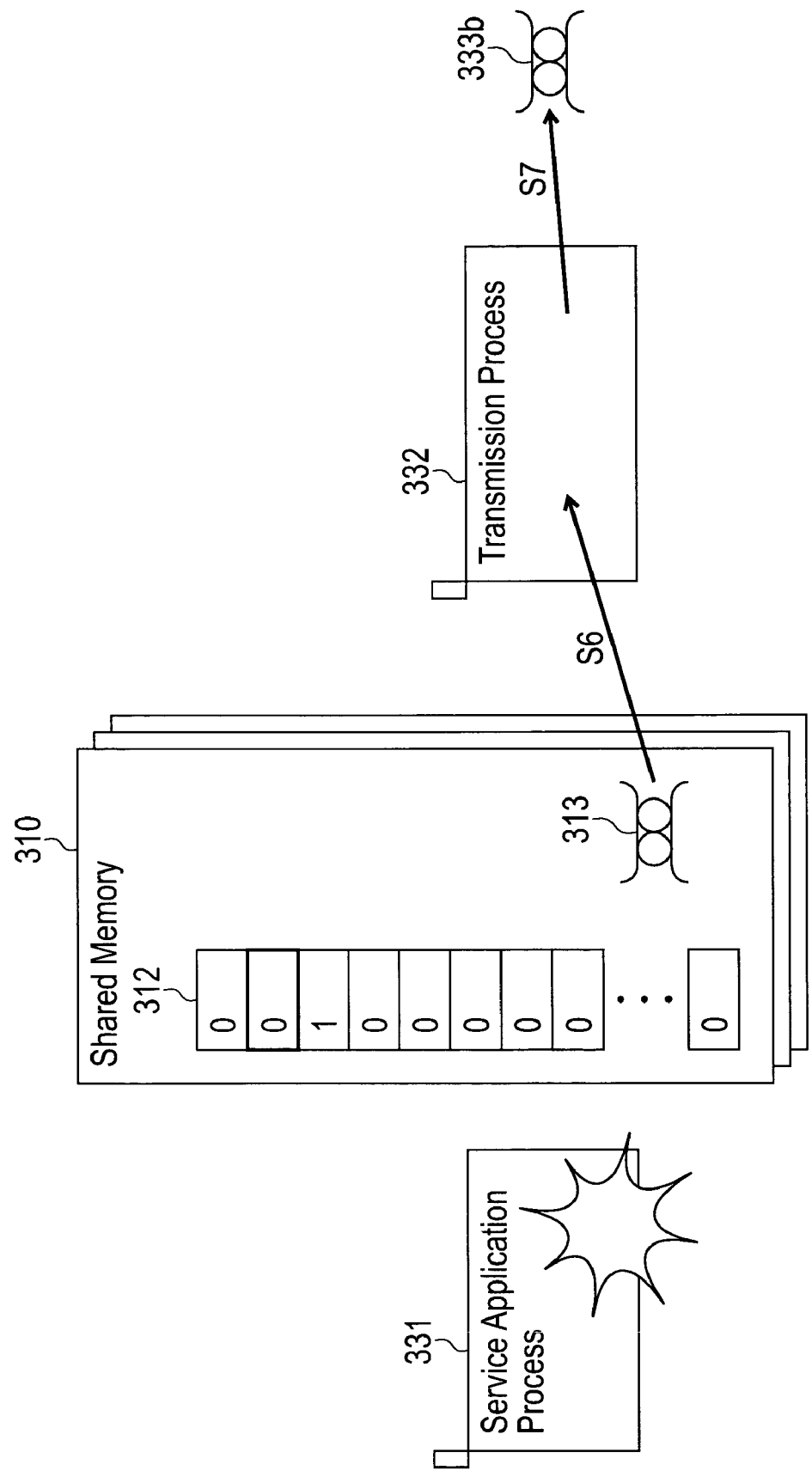

Now the operation of the server system 100 when a software failure occurs in the service application process 331 will be described with reference to FIG. 6.

A known cause of a software failure is a memory fault, for example. The memory fault is a type of exception which occurs when a program attempts to access a memory area other than the allocated segment.

As mentioned above, the redundancy server system 100 of the present embodiment has a management bit map area 312 and synchronization request queue 313, so the transmission process 332 can recognize the segment written or overwritten by the service application process 331. Therefore according to the present embodiment, the service application process 331 and transmission process 332 can be operated independently. Even if a failure occurs to the service application process 331, the transmission process 332 can access the shared memory area 310. Therefore even if a failure occurs to the service application process 331, the data application client library 333 can perform processing to create the synchronization data management table (see step S6 in FIG. 6) and processing to send the synchronization data management table to the standby server 102 (step S7 in FIG. 6).

In the present embodiment, the data duplication client library 333 and data duplication controller 340 are installed separately, but these may be integrated.

What is claimed is:

1. A redundancy system, comprising:
   a plurality of devices of which the active status and standby status can be switched;
   a synchronization data memory installed in each of said plurality of devices;
   a management bit map table having a flag created for each segment of said synchronization data memory in an active device;
   a management memory for storing synchronization information including a starting address of said segment;
   a first processor for performing service using one or a plurality of said segments, and setting said flag corresponding to said segment and writing said synchronization information to said management memory each time said segment is written or overwritten; and
   a second processor for checking each flag in said management bit map table at a predetermined timing, and reading synchronization data from said segment corresponding to said synchronization information stored in said management memory and resetting said flag if a flag being set exists.

2. The redundancy system according to claim 1, wherein said active device further comprises a third processor for receiving said synchronization information and said synchronization data from said second processor, and creating a synchronization data management table including said synchronization information and said synchronization data.

3. The redundancy system according to claim 2, wherein said third processor sends information included in said synchronization data management table to another device.

4. The redundancy system according to claim 3, wherein said active device further comprises a system manager for monitoring the operation of said first processor and deciding the transmission timing of said third processor based on the monitoring result.

5. The redundancy system according to claim 4, wherein said active device further comprises a data duplication controller for sending a transmission start instruction and communication control information, for sending information included in said synchronization data management table to another device, to said third processor when said instruction is received from said system manager.

6. The redundancy system according to claim 5, wherein said standby device further comprises a fourth processor for creating said synchronization data management table using information received from said third processor.

7. The redundancy system according to claim 6, further comprising a fifth processor for synchronizing stored data of said synchronization data memories in said active device and said standby device by overwriting the stored data of said synchronization data memory in said standby device using said synchronization data management table created by said fourth processor.

8. The redundancy system according to claim 6, wherein said fourth processor synchronizes the stored data of said synchronization data memories in said active device and said standby device by overwriting the stored data of said synchronization data memory in said standby device using said synchronization data management table created by said fourth processor.

9. The redundancy system according to claim 1, wherein the stored data of said synchronization data memory includes an instance constructed by an object oriented program.

10. The redundancy system according to claim 1, wherein said synchronization data memory and said management bit map table are installed for each said first processor.

11. The redundancy system according to claim 1, wherein said management memory for storing synchronization information further includes information which indicates a size of said segment.

12. A synchronization method for a redundancy system, comprising:
    a first step of setting a synchronization data memory area in each shared memory of a plurality of devices of which active status and standby status can be switched;
    a second step of setting a management bit map table having a flag created for each segment of a synchronization data memory area in said shared memory in an active device;
    a third step of setting a management memory area for storing synchronization information including a starting address of said segment in said shared memory of the active device;
    a fourth step of causing a processor to execute a service application process of performing service using one or a plurality of said segments, and setting said flag corresponding to said segment and writing said synchronization information to said management memory area each time said segment is written or overwritten; and
    a fifth step of causing said processor to execute a read process of checking each flag in said management bit map table at a predetermined timing, and reading synchronization data from said segment corresponding to said synchronization information stored in said management memory area and resetting said flag when a flag being set exists.

13. The synchronization method according to claim 12, further comprising a sixth step of causing a data duplication library to receive said synchronization information and said synchronization data from said read process, and to create a synchronization data management table including said synchronization information and said synchronization data.

14. The synchronization method according to claim 13, further comprising a seventh step of causing the data duplication library to send information included in said synchronization data management table to another device.

15. The synchronization method according to claim 14, further comprising an eighth step of causing a system manager to monitor the operation of said service processor and to decide the transmission timing of said data duplication library based on the monitoring result.

16. The synchronization method according to claim 15, further comprising a ninth step of a data duplication controller sending a transmission start instruction and communication control information, for sending information included in said synchronization data management table to another device, to said data duplication library when said instruction is received from said system manager.

17. The synchronization method according to claim 16, further comprising a tenth step of the data duplication library of said standby device creating a synchronization data management table using information received from the data duplication library of said active device.

18. The synchronization method according to claim 17, further comprising an eleventh step of synchronizing the stored data of said synchronization data memories in said active device and said standby device by overwriting the stored data of said synchronization data memory in said standby device using said synchronization data management table created by the data duplication library in said standby device.

19. The synchronization method according to claim 17, further comprising an eleventh step of the data duplication library of said standby device synchronizing the stored data of said synchronization data memories in said active device and said standby device by overwriting the stored data of said synchronization data memory in said standby device using said synchronization data management table created by said data duplication library.

20. The synchronization method according to claim 12, wherein said stored data of said synchronization data memory includes an instance constructed by an object oriented program.

21. The synchronization method according to claim 12, wherein said synchronization data memory and said management bit map table are created for each said service application process.

22. The synchronization method according to claim 12, wherein said management memory for storing synchronization information further includes information which indicates a size of said segment.

* * * * *